Patented June 1, 1943

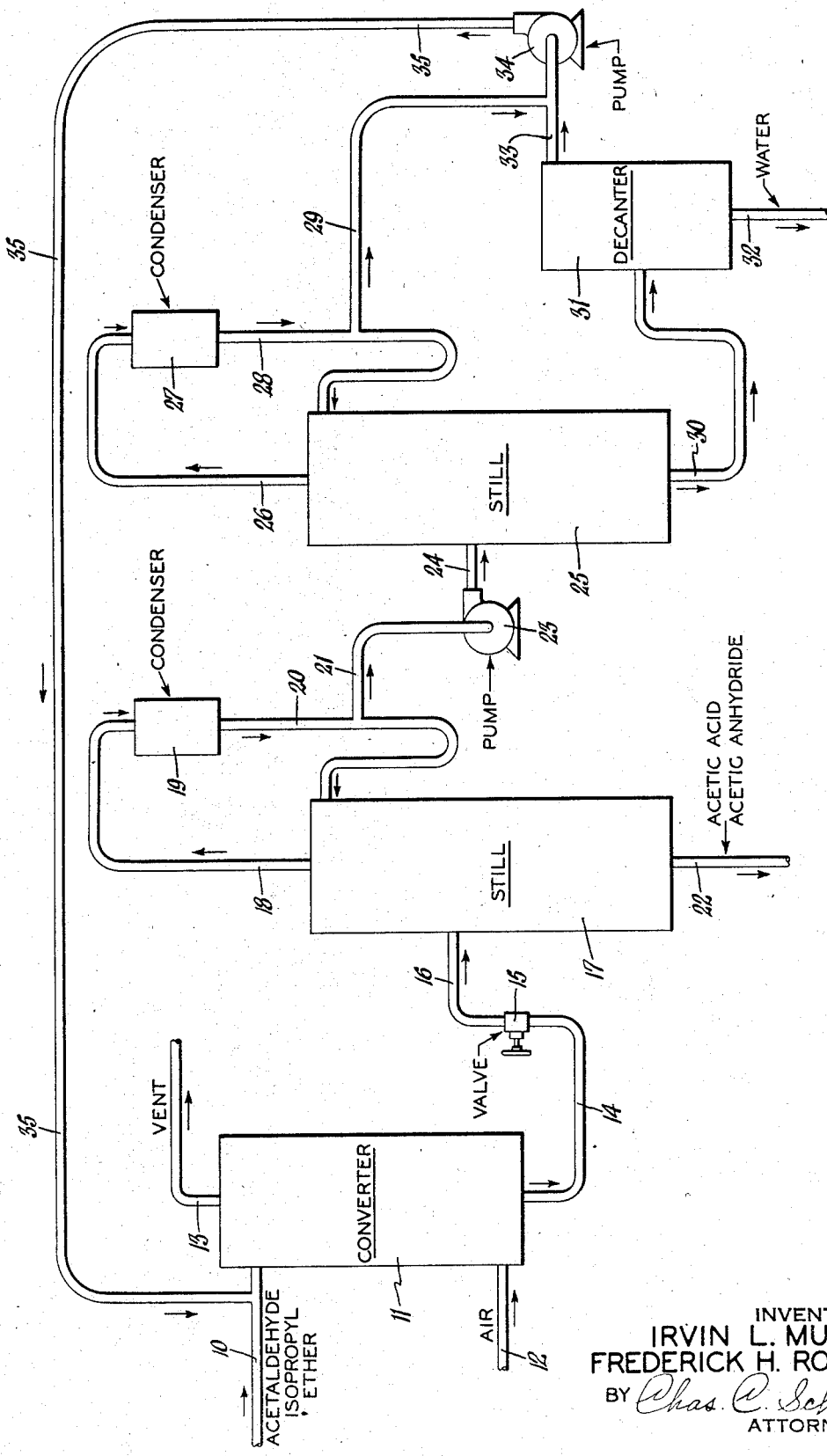

2,320,461

UNITED STATES PATENT OFFICE 2,320,461

SEPARATION OF ALIPHATIC ANHYDRIDES FROM MIXTURES CONTAINING WATER

Irvin L. Murray and Frederick H. Roberts, Charleston, W. Va., assignors to Carbide and Carbon Chemicals Corporation, a corporation of New York Application December 5, 1939, Serial No. 307,574

4 Claims. (Cl. 260—546)

This invention relates to the formation of aliphatic anhydrides by the direct oxidation of the corresponding aldehyde by means of molecular oxygen.

It is known that aldehydes may be oxidized by means of molecular oxygen to form the corresponding anhydride and water according to the equation:

$$2RCHO + O_2 \rightarrow (RCO)_2O + H_2O$$

The reaction of the anhydride with the water to form the acid is quite slow at low temperatures so that it is possible to separate the water and unreacted aldehyde from the reaction product by distillation under reduced pressure, or by other means, without causing hydrolysis of an unduly large amount of the anhydride present.

The water can be removed from the anhydride most satisfactorily by low-temperature distillation, but where the aldehyde has a boiling point below that of water, the unreacted aldehyde present in the mixture from the oxidation reaction must be removed first, or simultaneously with the water. If this is done directly by distillation, it is prohibitively expensive, from the commercial standpoint when conditions of temperature and pressure are maintained that will reduce the hydrolysis of the anhydride to a reasonable amount. For example, the rate of hydrolysis of acetic anhydride is very high above 60° C., and it is quite high from 50° to 60° C. Therefore, in order to recover a reasonable quantity of acetic anhydride from the reaction mixture it is necessary to keep the temperature of the mixture below 60° C. If acetaldehyde is to be separated from the reaction mixture by vacuum distillation, the absolute pressure at the head of the still column must not be greater than three inches of mercury, in order to reduce the temperature of the mixture of anhydride and water in the base of the column or kettle to 60° C. At this absolute pressure the boiling point of acetaldehyde is minus 30° C. The costliness of condensing acetaldehyde by refrigeration at this low temperature, or of compressing the vapor (containing some wet acetic acid) from this pressure to about 15 pounds per square inch gauge pressure to be condensed with ordinarily available cooling water, is apparent. This represents the maximum temperature and minimum absolute pressure that can be used. In order to obtain good recovery of the anhydride by this method, the temperature must be lowered and the pressure raised even further. Although the recovery of acetic anhydride from the reaction mixture containing acetaldehyde is an extreme example of the problems involved, the same problems are present in the commercial recovery of higher aliphatic anhydrides from their corresponding reaction mixtures, and this is particularly true where the aldehyde is more volatile than water. However, in the recovery of any anhydride from its reaction mixture, or from any mixture containing water, it is highly desirable to maintain the anhydride at as low a temperature as is possible until the water is removed.

This invention provides a simple and efficient means of separating aliphatic anhydrides from mixtures which contain water. This method makes low costs of production and a minimum amount of hydrolysis of the anhydride possible. The invention particularly provides an efficient means of simultaneously separating both aldehyde and water from mixtures containing aliphatic anhydrides, the corresponding acid, aldehyde and water. This separation may be accomplished by distilling the mixture in the presence of a solvent which does not react chemically or form an azeotropic mixture with the aliphatic acid or with the anhydride, but which will form an azeotropic mixture with water. By this means the boiling point of the mixture is lowered and the water and aldehyde may be completely removed without removing either the acid or anhydride. Simultaneously with the removal of the water and aldehyde, the solvent is separated from the reaction mixture, and the anhydrous acid and anhydride are left to be separated by further distillation.

The solvent preferred for use in this invention is isopropyl ether, as this substance forms a heterogeneous azeotrope with water. This azeotrope is composed of 95.9% by weight isopropyl ether and 4.1% water, and separates in the liquid phase into the ether and water, which are substantially immiscible. This separation, however, does not take place in the presence of substantial quantities of aldehyde, as the latter is a mutual solvent for water and isopropyl ether. This invention is particularly directed to the recovery of aliphatic anhydrides made by the oxidation of aldehydes which are more volatile than water, and in its preferred form the invention comprises adding isopropyl ether to the aldehyde supplied to the oxidation converter in which air is blown through the mixture to cause the oxidation of the aldehyde to anhydride. The reaction mixture from the converter, containing water, aliphatic acid, aliphatic anhydride, aldehyde and isopropyl ether is distilled to separate the acid and anhydride from the mixture of aldehyde, isopropyl ether and water. The distillate, consisting of aldehyde, water and isopropyl ether, is distilled again to remove aldehyde. The mixture of water and isopropyl ether is removed from the bottom of the still and passed into a decanter where the ether and water layer out, or separate into two layers. From the decanter, the ether layer may be recycled directly to the oxidation converter.

In the oxidation of acetaldehyde and propionaldehyde, very satisfactory results are obtained when the oxidation reaction is operated at a pressure from about 50 to about 100 pounds per square inch, and at a temperature of about 40° to about 80° C. The distillation of the oxidation product from the converter may be conducted under subatmospheric pressure with condensation of distillate effected by ordinary cooling water, and for the most economical operation a vacuum of about 15 inches is recommended.

The accompanying drawing diagrammatically illustrates the flow of materials in a typical system for the oxidation of aldehydes, according to the invention.

In the system shown, a mixture of acetaldehyde and isopropyl ether is supplied through a line 10 to a vessel (or converter) 11, and air is admitted through a line 12 into the bottom of the converter 11 where the acetaldehyde is oxidized to acetic anhydride under a pressure of, for example, about 100 pounds per square inch. The residual nitrogen and unabsorbed oxygen, if any, together with some acetaldehyde and isopropyl ether vapor, leave the reaction vessel 11 through a vent line 13. Any acetaldehyde vapor in the vent gases may be recovered by scrubbing with cold water or adsorption in activated carbon, followed by distillation. From the reaction vessel, or converter 11, the mixture of acetic anhydride, acetic acid, water, unreacted acetaldehyde and isopropyl ether passes through a line 14 to a reducing valve 15 which reduces the pressure from about 100 pounds per square inch to about 15 inches vacuum. From the reducing valve 15 the mixture passes through a line 16 into a still 17. In the still 17, which is operated under a vacuum of about 15 inches, the isopropyl ether and water form an azeotropic mixture which is removed along with acetaldehyde in the vapor state through a line 18 and supplied to a condenser 19 in which the mixture of acetaldehyde, isopropyl ether and water is condensed. From the condenser 19 the mixture passes through a line 20, part thereof returning to the still 17 to supply the necessary reflux, the rest being removed through a line 21 for separation and recovery of the components. From the bottom of the still 17 an anhydrous mixture of acetic acid and acetic anhydride (which may contain some isopropyl ether) is removed through a line 22. This mixture may be separated into its components by distillation, if desired. From the line 21, the mixture of acetaldehyde, water and isopropyl ether passes into a pump 23 by means of which it is forced into a line 24 and then into a still 25 in which the acetaldehyde is distilled from the other components and removed as vapor through a line 26. From the line 26 the acetaldehyde vapor passes into a condenser 27 in which it is condensed and passes out through a line 28, part of the acetaldehyde returning to the still 25 as reflux therefor, and the rest of the acetaldehyde being drawn off through a line 29. If ordinary cooling water is to be used to condense the acetaldehyde in the condenser 27, it is necessary that the still 25 be operated under superatmospheric pressure, for example, about 30 pounds per square inch. From the bottom of the still 25 the mixture of isopropyl ether and water is removed through a line 30 and is passed into a decanter 31 in which the water and isopropyl ether separate into two layers. Since the water is heavier than the isopropyl ether it is withdrawn from the bottom of the decanter 31 through a line 32. From the top of the decanter 31 the isopropyl ether is removed through a line 33 and supplied to a pump 34 by means of which the isopropyl ether is returned to the converter 11 through a line 35. The acetaldehyde in the line 29 passes into the line 33 where it is mixed with the recovered isopropyl ether and returned to the converter 11.

The following examples illustrate typical results that may be obtained by the process of this invention.

*Example 1*

By introducing the isopropyl ether into the reaction zone along with the aldehyde, the rate of the hydrolysis of the anhydride is reduced, with the result that higher yields may be obtained. This is illustrated in the following table which gives the composition, in percent by weight, of the products from the oxidation zone and the yield obtained in the oxidation of acetaldehyde and propionaldehyde to acetic anhydride and propionic anhydride, respectively:

| | Product from oxidation zone | | | |
|---|---|---|---|---|
| | Acetaldehyde oxidation | | Propionaldehyde oxidation | |
| | With diluent | No diluent | With diluent | No diluent |
| Yield (percent of oxidized aldehyde present as anhydride) | 55.0 | 42.0 | 49.0 | 47.0 |
| Anhydride_____per cent__ | 20.0 | 18.0 | 22.0 | 12.6 |
| Peroxide_____do____ | 0.5 | 0.1 | 0.6 | 0.2 |
| Isopropyl ether_____do____ | 45.0 | -------- | 42.0 | -------- |
| Aldehyde_____do____ | 10.6 | 49.4 | 6.3 | 68.7 |
| Water_____do____ | 3.5 | 3.2 | 3.1 | 1.7 |
| Acid_____do____ | 20.4 | 29.3 | 26.0 | 16.8 |

*Example 2*

The following reaction velocity constants, calculated in mols per liter per minute, illustrate the inhibiting effect of isopropyl ether upon the hydrolysis of acetic and propionic anhydride, respectively, in the presence of one mol of water, at 50° C.

| | Acetic anhydride | Propionic anhydride |
|---|---|---|
| No diluent_____ | 0.0188 | 0.0075 |
| Isopropyl ether_____ | 0.0066 | 0.0045 |

*Example 3*

This example illustrates the effectiveness of isolating propionic anhydride, by the use of isopropyl ether, from a mixture containing water. A mixture of propionaldehyde, propionic acid, propionic anhydride, water and isopropyl ether was supplied to a still column at the rate of 480 parts by weight per hour, at a point 1000 mm. from the top. The still column was 2500 mm. high, 28 mm. in diameter, packed with 6 mm. glass rings. This still was operated continuously under an absolute pressure of about 250 mm. of mercury. The composition of the oxidation product supplied to the column was as follows:

| | Percent by weight |
|---|---|
| Propionic anhydride | 19.1 |
| Propionic acid | 32.9 |
| Propionaldehyde | 10.0 |
| Water | 3.0 |
| Ether | 35.0 |

In order to start the still, 501 parts by weight of a mixture of propionic acid and propionic anhydride (containing half of each) were charged in the kettle. After 1320 parts by weight of the oxidation product had been supplied to the column and distilled therein, 1108 parts by weight of a mixture of 59.8% propionic acid and 40.4% propionic anhydride were recovered from the kettle. Six hundred forty parts by weight of distillate were obtained which showed an acidity of about 10.3% (calculated as propionic acid). This corresponds to a material recovery of about 96%, or a recovery of 92.7% propionic anhydride, corrected for material loss.

As mentioned above, the isopropyl ether, water and unreacted aldehyde are first distilled from the mixture obtained from the oxidation reaction, and then the aldehyde is removed from the ether, water, and any entrained acid in a second still. With other diluents, such as ethyl acetate, it is then necessary to dehydrate the diluent in a third still and to recover the diluent from the water layer in a fourth still. With isopropyl ether the third and fourth stills are not necessary, and the ether may be separated from the water by decantation at the base of the second still and returned directly to the oxidation reaction, since the ether and water are practically immiscible. This obviates the need for the third and fourth stills.

In addition to the method shown, the removal of aldehyde and water from the products of reaction may be accomplished by supplying the isopropyl ether directly to the still rather than passing it in admixture with the aldehyde through the reaction zone. This method, however, has the limitation that the isopropyl ether is not present in the reaction mixture during the oxidation of the aldehyde to serve as a diluent for inhibiting the hydrolysis of the anhydride at the elevated temperatures employed.

Many variations of the process will be apparent, and the invention should not be limited other than as defined by the appended claims.

We claim:

1. In a continuous process for making an aliphatic acid anhydride by direct oxidation of an aliphatic aldehyde with molecular oxygen the steps which include passing molecular oxygen through an aliphatic aldehyde admixed with isopropyl ether in an amount sufficient to reduce the rate of hydrolysis of the acid anhydride in the reaction mixture resulting from the oxidation of said aldehyde; thereafter distilling water, isopropyl ether and unreacted aldehyde from the acid anhydride in said reaction mixture and recovering said anhydride; separating isopropyl ether and unreacted aldehyde from distillate resulting from such distillation, and returning said isopropyl ether and said unreacted aldehyde to a reaction zone for further oxidation of aldehyde directly by molecular oxygen in the presence of isopropyl ether.

2. A process for making an aliphatic acid anhydride by direct oxidation of an aliphatic aldehyde with molecular oxygen which comprises passing molecular oxygen through an aliphatic aldehyde admixed with isopropyl ether in an amount sufficient to reduce the rate of hydrolysis of the acid anhydride in the reaction mixture resulting from the oxidation of said aldehyde; and thereafter distilling water, isopropyl ether and unreacted aldehyde from the acid anhydride in said reaction mixture and recovering said anhydride.

3. A process for making acetic anhydride by direct oxidation of acetaldehyde with air which comprises passing air through acetaldehyde admixed with isopropyl ether in an amount sufficient to reduce the rate of hydrolysis of the acetic anhydride in the reaction mixture resulting from the oxidation of the acetaldehyde; and thereafter distilling water, isopropyl ether and unreacted acetaldehyde from the acetic anhydride in said reaction mixture and recovering said anhydride.

4. In a continuous process for making acetic anhydride by direct oxidation of acetaldehyde with air, the steps which include passing air through acetaldehyde admixed with isopropyl ether in an amount sufficient to reduce the rate of hydrolysis of the acetic anhydride in the reaction mixture resulting from the oxidation of acetaldehyde; thereafter distilling water, isopropyl ether and unreacted acetaldehyde from the acetic anhydride in said reaction mixture and recovering said anhydride; separating isopropyl ether and unreacted acetaldehyde from distillate resulting from such distillation and returning said isopropyl ether and said unreacted acetaldehyde to a reaction zone for further oxidation of the acetaldehyde directly by air in the presence of isopropyl ether.

IRVIN L. MURRAY.
FREDERICK H. ROBERTS.